(12) United States Patent
Negulescu et al.

(10) Patent No.: US 6,290,464 B1
(45) Date of Patent: Sep. 18, 2001

(54) TURBOMACHINE ROTOR BLADE AND DISK

(75) Inventors: Dimitrie Negulescu; Michael Lötzerich, both of Berlin (DE)

(73) Assignee: BMW Rolls-Royce GmbH, Oberursel (DE)

( * ) Notice: Subject to any disclaimer, the term of this patent is extended or adjusted under 35 U.S.C. 154(b) by 0 days.

(21) Appl. No.: 09/449,836

(22) Filed: Nov. 26, 1999

(30) Foreign Application Priority Data

Nov. 27, 1998 (DE) ............................................. 198 54 908

(51) Int. Cl.⁷ ....................................................... F01D 5/08
(52) U.S. Cl. ......................... 416/97 R; 416/239; 416/248
(58) Field of Search ..................................... 415/115, 176, 415/178, 202; 416/96 R, 96 A, 97 R, 248, 239

(56) References Cited

U.S. PATENT DOCUMENTS

| | | | |
|---|---|---|---|
| 3,791,758 | * | 2/1974 | Jenkinson ............................. 415/116 |
| 4,292,008 | * | 9/1981 | Grosjean et al. .................... 415/115 |
| 4,425,079 | * | 1/1984 | Speak et al. ......................... 415/139 |
| 4,820,116 | * | 4/1989 | Hovan et al. ........................ 415/115 |
| 5,795,130 | * | 8/1998 | Suenaga et al. ...................... 416/95 |
| 6,022,190 | * | 2/2000 | Schillinger ......................... 416/96 R |
| 6,071,075 | * | 6/2000 | Tomita et al. ..................... 416/97 R |

FOREIGN PATENT DOCUMENTS

| | | |
|---|---|---|
| 906636 | 3/1954 | (DE) . |
| 3210626 | 11/1982 | (DE) . |
| 3835932 | 4/1990 | (DE) . |
| 19705442 | 8/1998 | (DE) . |
| 2057573 | 8/1979 | (GB) . |

* cited by examiner

Primary Examiner—Edward K. Look
Assistant Examiner—Ninh Nguyen
(74) Attorney, Agent, or Firm—Pillsbury Winthrop LLP

(57) ABSTRACT

This invention relates to a blade of a turbomachine, more particularly an axial-flow high-pressure turbine, having at least one integrated cooling air duct issuing at the downstream back of the blade root when viewed in the direction of the working gas conducted by the blade. This invention also relates to a rotor disk of a turbomachine having several blades designed in accordance with the present invention. The cooling air duct in accordance with this invention branches off from a cooling air chamber provided in the blade root, from which chamber a cooling air duct issuing at the surface of the blade conducting the working gas is supplied with cooling air, where the cooling air duct issuing at the back of the blade root deflects the cooling air flow through it and provides an essentially continuous passage. The cooling air-duct is preferably made to converge in the direction from the cooling air chamber toward its outlet port and is shaped in accordance with design rules for axial-flow reaction turbines. On a rotor disk of a turbomachine having several such blades, the cooling air duct can continue through a lock-plate that is provided at the back of the blades and attached to the rotor disk.

8 Claims, 6 Drawing Sheets

TURBOMACHINE ROTOR BLADE AND DISK

REFERENCE TO OTHER APPLICATIONS

This application claims priority to German patent application no. 198 54 908.3 filed Nov. 27, 1998, which is incorporated by reference herein.

1. Field of the Invention

This invention relates to a blade of a turbomachine, more particularly of an axial-flow high-pressure turbine, having at least one integrated cooling air duct, which when viewed in the direction of flow of the working gas conducted by the blade, issues at the downstream back of the blade root. This invention also relates to a rotor disk of a turbomachine having several blades designed in accordance with the present invention. For related state of the art, reference is made to GB 2 057 573 A and DE 32 10 626 C2.

2. Description of the Prior Art

A blade of this description may find use in the high-pressure turbine of an aircraft gas turbine engine. An optimally designed cooling system of a high-performance aircraft engine then requires for each of its generally multiple turbine stages, especially high-pressure turbine stages, an optimized, i.e. minimized, flow of cooling air of a suitably adapted inlet temperature and feed pressure. The first high-pressure turbine stage, for example, obtains its cooling air from the final stage of a multiple-stage compressor, which in aircraft engines is arranged upstream of the high-pressure turbine, while the second high-pressure turbine stage obtains its cooling air from one of the final compressor stages, and a third turbine stage, if present, obtains its cooling air from one of the central compressor stages. An engine cooling system designed along these lines needs a complex cooling air ducting network flange-mounted to the compressor and turbine casings. Said design is however impaired by its heavy weight and susceptibility to breakdowns.

For cooling the turbine stages, especially high-pressure turbine stages, i.e. for cooling the associated blades and rotor disks, use can generally also be made of the internal cooling air flow of the turbomachine/gas turbine or aircraft engine, said flow normally being delivered by a single feed source of cooling air, i.e., by the final compressor stage, but this cooling air flow lacks adequate cooling capacity especially for the final high-pressure turbine stage of the multiple-stage high-pressure turbine, considering that said cooling air flow necessarily picks up heat in its passage along the preceding cooling air ducts. Said preceding cooling air ducts normally extend through the turbine rotor disk or the roots of the blades arranged on the rotor disk, as is shown in particular in the initially cited GB 2 057 573 A.

SUMMARY OF THE INVENTION

The object underlying the present invention is to provide a remedy for the problem described above. The solution of this problem is to provide an arrangement characterized in that the cooling air duct issuing at the back of the blade root branches off from a cooling air chamber provided in the blade root from which at least one cooling air duct issuing at the gas-wetted surface of the blade is provided with cooling air, and in that the cooling air duct issuing at the back of the blade root is designed to deflect the cooling air stream it carries while providing a substantially continuous passage.

Further objects and advantages of the present invention are cited in the subclaims by way of a turbomachine rotor disk having several blades in accordance with the present invention.

BRIEF DESCRIPTION OF THE DRAWINGS

This invention is more fully described on the basis of the accompanying drawings showing three preferred embodiments, where each of the features detailed may form an essential part of the inventive concept. In the drawings.

DETAILED DESCRIPTION OF THE INVENTION

Figure 1A:
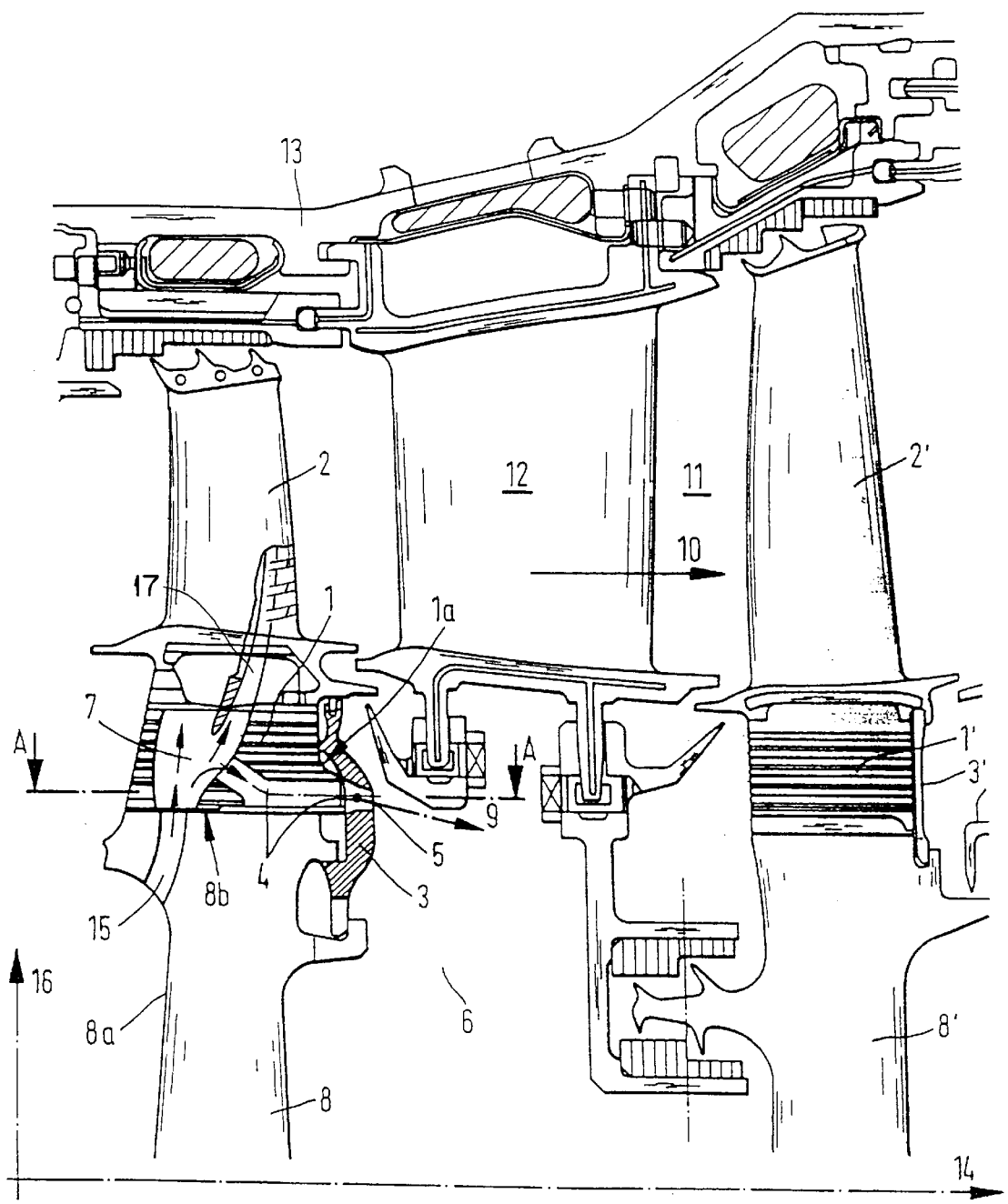
FIG. 1a is a partial longitudinal section illustrating a two-stage high-pressure turbine the stage-1 rotor disk of which in a first embodiment carries blades in accordance with the present invention.
Figure 1B:
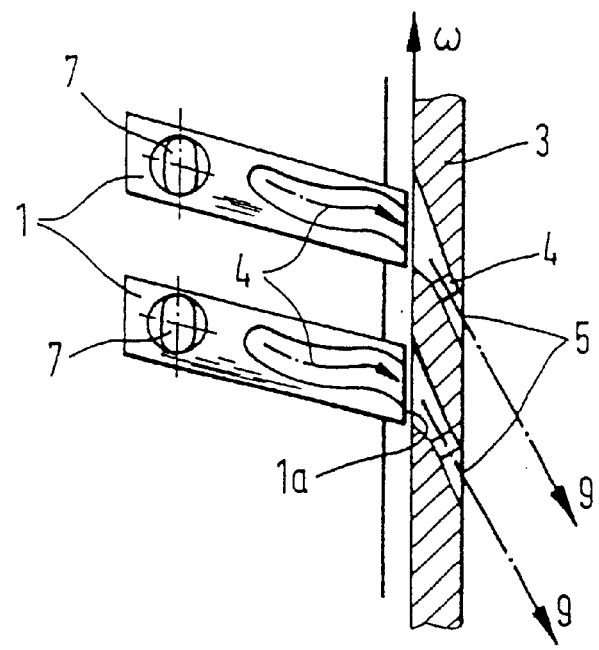
FIG. 1b is a sectional view along A—A from FIG. 1a, FIG. 1c is a perspective partial view of a lock-plate securing the blades in position on the rotor disk, FIG. 2a reflects the arrangement of FIG. 1a and illustrates blades designed in accordance with a second embodiment.
Figure 1C:
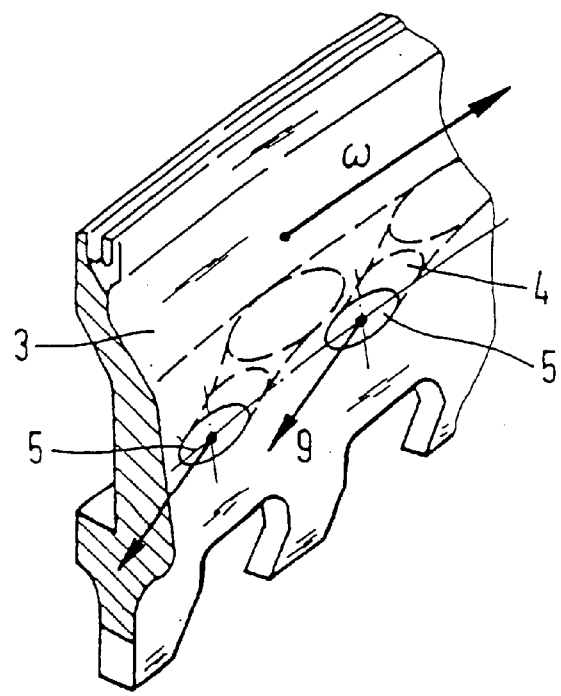

Reference numeral 8 in all drawings indicates the rotor disk of the first stage of an axial-flow high-pressure turbine of an aircraft engine, said disk being followed downstream by a stage-2 rotor disk 8'. Stage-1 rotor disk 8 and stage-2 rotor disk 8' each carry in the normal manner a plurality of circumferentially spaced turbine rotor blades 2 and 2' respectively, (hereafter briefly called blades 2, 2'), projecting into an annular duct 11 which conducts the working gas of the turbomachine in the direction of arrowhead 10. Projecting also into this duct between the stage-1 blades 2 and the stage-2 blades 2' is in the normal manner a plurality of nozzle vanes 12 attached to casing 13 of the axial-flow turbine. Reference numeral 14 indicates the axis of rotation of the axial-flow turbine about which rotate rotor disks 8, 8', connected to one another in a manner not shown in the drawing.

Blades 2 and 2' are attached to their disks 8 and 8', respectively, in the normal manner. Viewed in the downstream direction 10, blades 2, 2' have fir-tree roots 1 and 1' respectively, by which blades 2 and 2' are seated in correspondingly contoured recesses in the disks 8, 8'. Suitably designed lock-plates 3, 3' attached to rotor disks 8, 8' keep blades 2, 2' from slipping axially (in the direction of arrowhead 10).

To combat the high temperature loads imposed by the working gas flowing through annular duct 11, blades 2, 2' are cooled, i.e. at least one cooling duct 17 issues through a plurality of effusion holes onto the surface of blades 2, 2' that conduct or are energized by the working gas. Said cooling duct 17 is supplied with air from cooling air chamber 7 provided inside the blade root (which here is shown only for blade root 1), i.e. at least one cooling duct branches off from cooling air chamber 7.

This cooling air chamber 7 is supplied with cooling air through a feed duct 15 in rotor disk 8, which starts at upstream face 8a of rotor disk 8, viewed in the direction of flow 10, and issues into an unnumbered recess receiving blade root 1 in rotor disk 8. In this arrangement, the radially (16) inner wall 8b of rotor disk 8 confining said recess confines the cooling air chamber 7 at its radially (16) inner end, the chamber otherwise being confined by the blade root 1 into which it is recessed. A compressor upstream of the axial-flow high-pressure turbine supplies cooling air in a manner not shown in the drawing to the inlet port of feed duct 15 in the upstream face 8a, this being internal cooling air as previously described. This cooling air flow, part of which is ducted in a manner yet to be described through blade root 1 in the direction of flow 10, is indicated by unnumbered arrowheads.

Branching off from cooling chamber 7 is, besides the at least one cooling duct 17 which issues onto the surface of blade 2 in annular duct 11 through said effusion holes, an additional cooling air duct 4 which extends entirely inside blade root 1 and, without ever reaching into that portion of blade 2 which projects into annular duct 11, issues at the back 1a of blade root 1, viewed in the direction of flow 10. Through said cooling air duct 4, a portion of the cooling air flow being supplied to the inlet port of feed duct 15 in upstream face 8a of rotor disk 8, can reach a space 6 arranged between rotor disks 8 and 8', from where in a manner not illustrated (although similar to that used for stage-1 rotor disk 8) it is directed to and into blade 2' of stage-2 rotor disk 8'.

Figure 2A:
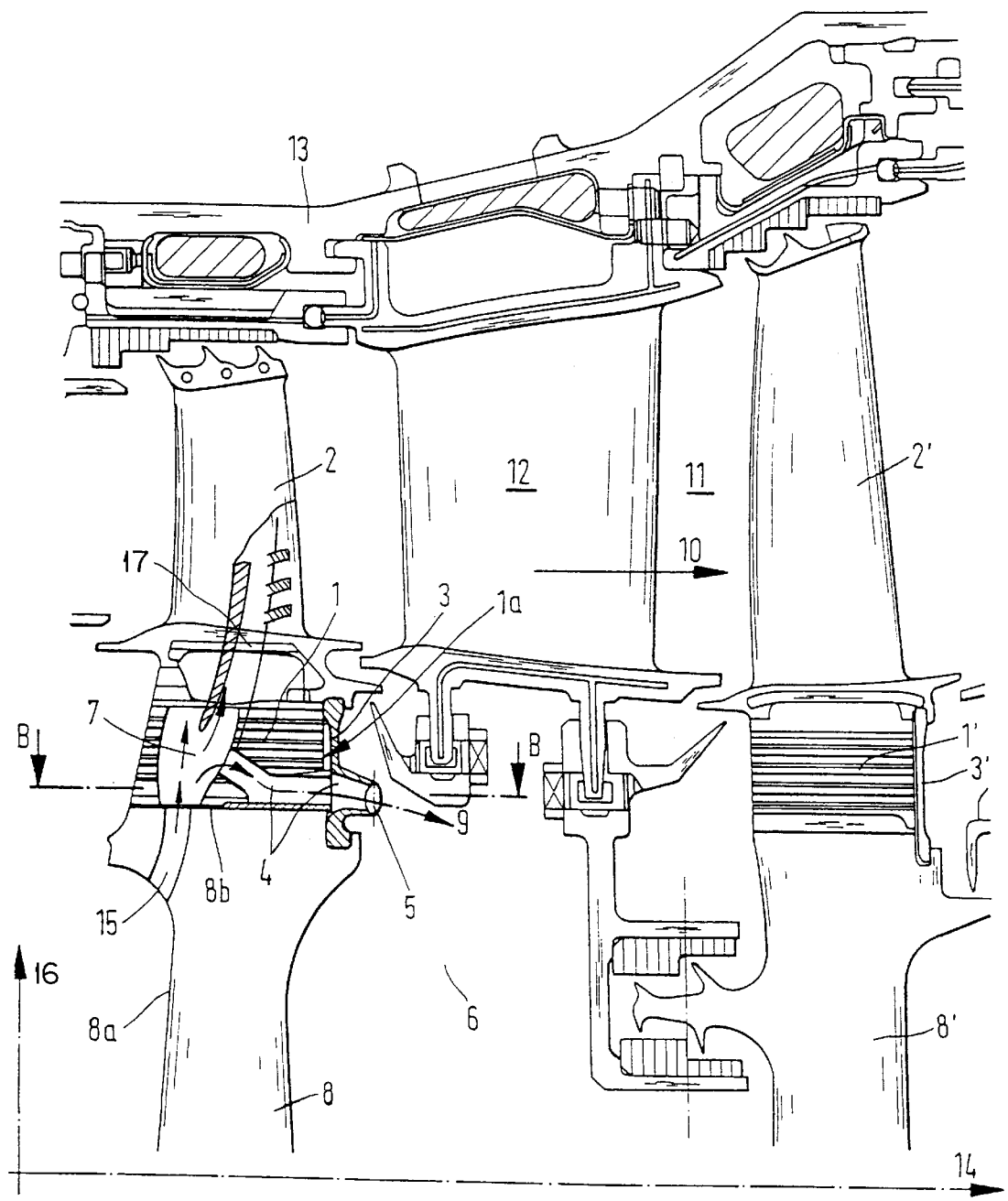
FIG. 2b is a sectional view along B—B from FIG. 2a, FIG. 3a reflects the arrangement of FIG. 1a and illustrates blades designed in accordance with a third embodiment.
Figure 3B:
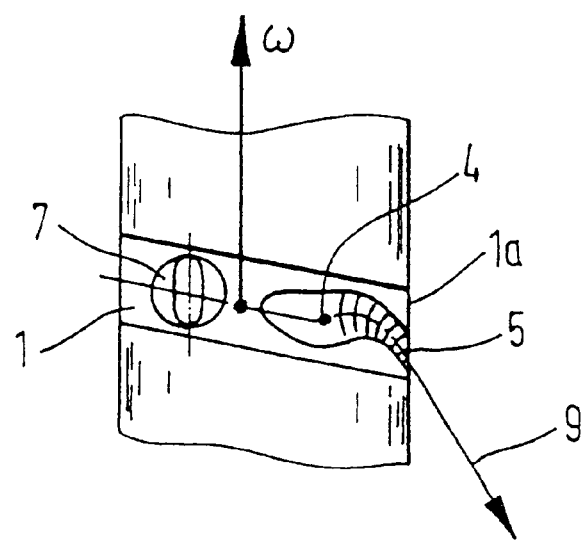
FIG. 3b is a sectional view along C—C from FIG. 3a, and FIG. 3c is a perspective view of the cooling air duct extending turbine-fashion through the blade root in accordance with FIGS. 3a and 3b.
Figure 3A:
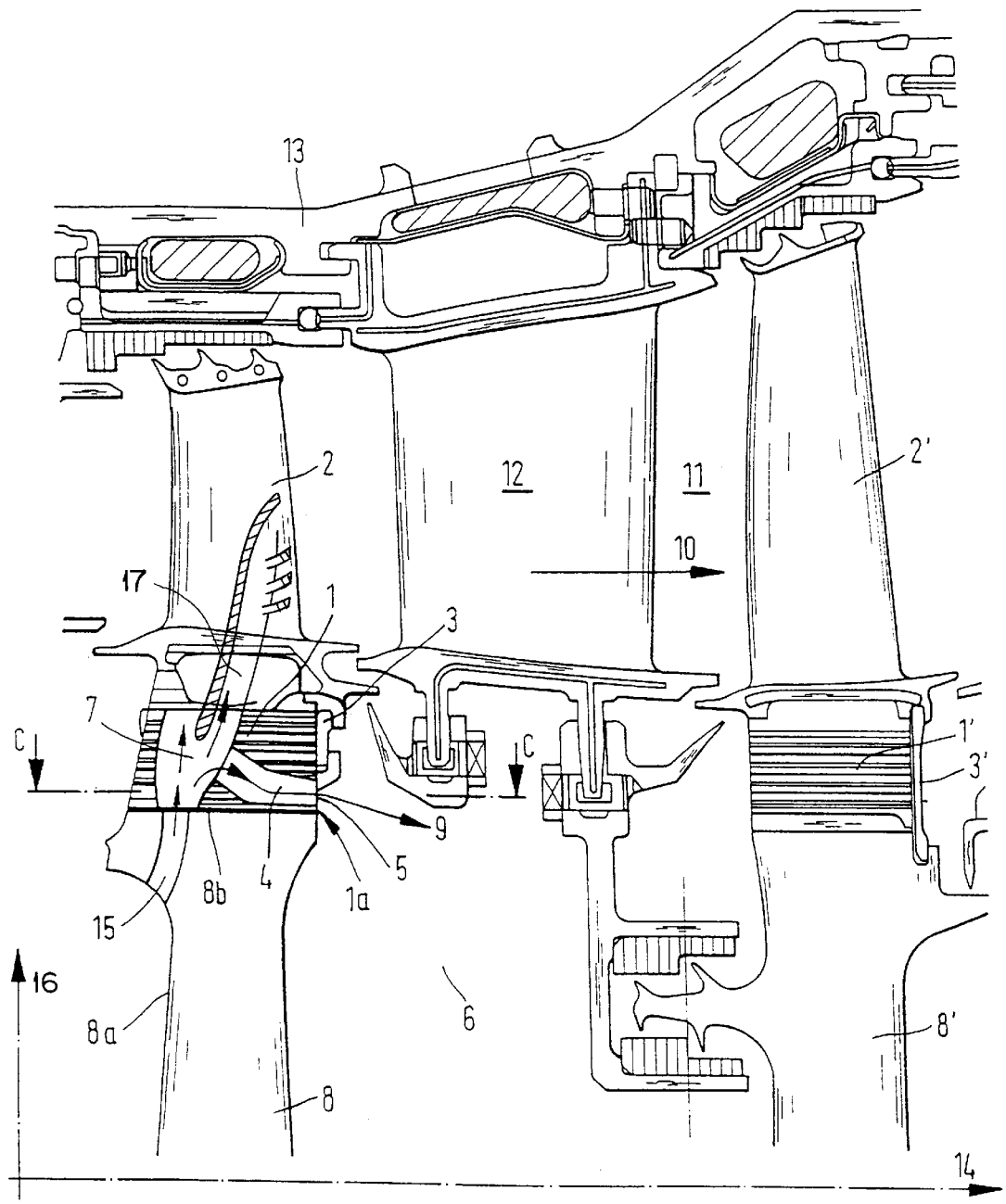

In the embodiment in accordance with FIG. 3a, cooling air duct 4 inside blade root 1 issues directly into space 6, i.e. the outlet port 5 of cooling air duct 4 is arranged in the back 1a of blade root 1. In the two embodiments of FIGS. 1a and 2a, the cooling air duct subsequently continues from the back 1a of blade root 1 in said lock-plate 3 and issues into space 6 through an outlet port 5 at the back of said plate facing away from blade root 1.

As it will become apparent, cooling air duct 4 extends in all embodiments substantially continuously from cooling air chamber 7 to outlet port 5, deflecting the cooling air flow inside it and taking a preferably convergent shape. Deflection of the cooling air flow itself, plus the essentially continuous passage, causes the cooling air ducts 4 provided in each blade 1 of rotor disk 8 to form, as a result of their appreciable length in conjunction with the fact that blade 1 and rotor disk 8 rotate about axis of rotation 14, a so-alled axial-flow microturbine. This characteristic causes the cooling air flow inside cooling air ducts 4 to gradually cool on its way from cooling air chamber 7 to outlet port 5. This constitutes an essential and desirable effect of the cooling air ducts 4 designed in the manner described above. The cooling of that portion of the air flow which is ducted to rotor disk 8 through blade roots 1 of stage-1 rotor disk 8 is advantageous for the reason that the cooling air flow subsequently reaching space 6 to cool stage-2 rotor disk 8' is cooler than it would otherwise be, if the cooling air ducts in the stage-1 blades 2 on stage-1 rotor disk 8 had not been designed as described.

Figure 3C:
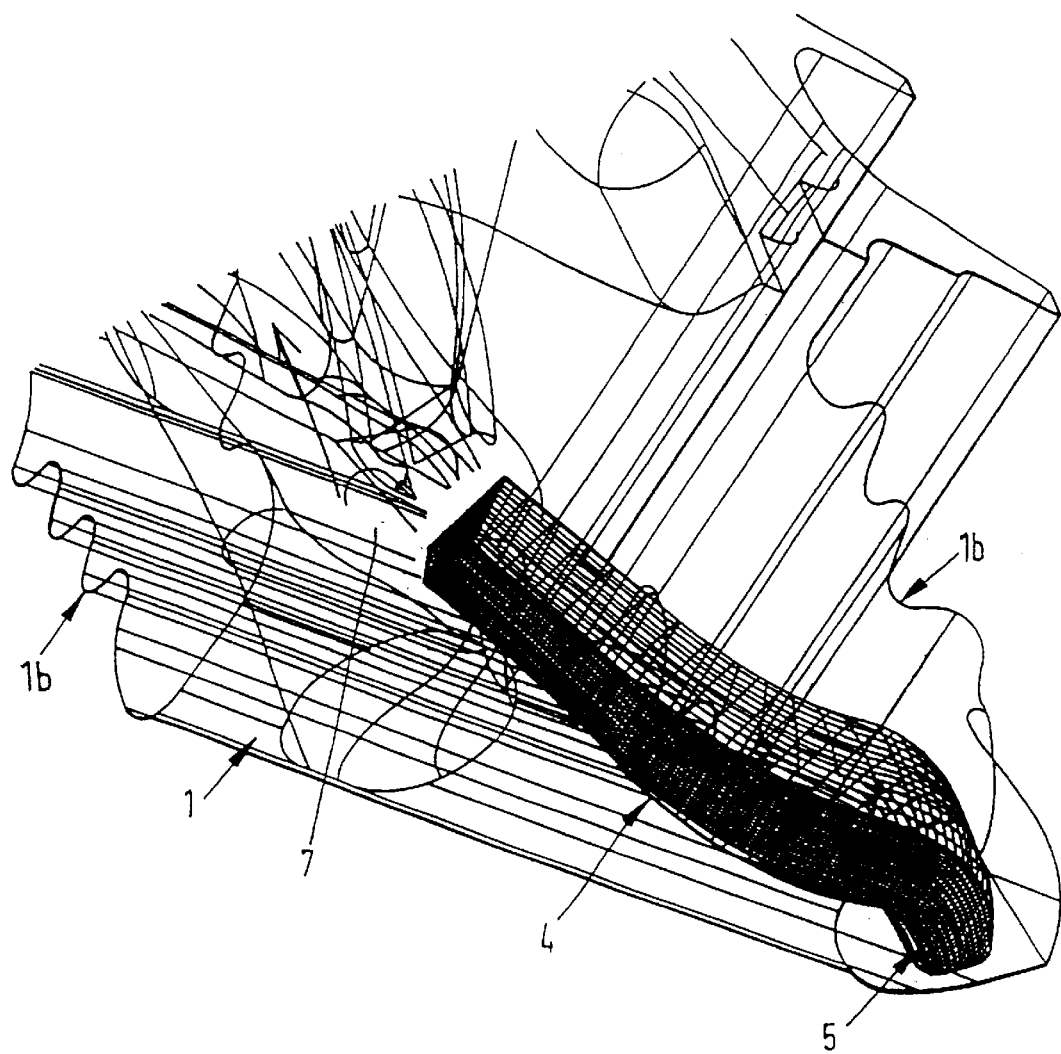

The effect just described can be enhanced still further if each cooling air duct 4 is given a shape that converges from cooling air chamber 7 toward outlet port 5, so that the cooling air flow through cooling air duct 4 is accelerated to improve the cooling effect. This puts the throat section of cooling air duct 4, as is the case with flow ducts in reaction turbines, near outlet port 5. In a preferred aspect of the present invention, cooling air duct 4 is designed to the rules applying for axial-flow reaction turbines, so that a realistic axial-flow microturbine actually results. FIG. 3c is a perspective view showing such a cooling air duct 4 extending in blade root 1, especially the duct depicted in FIGS. 3a, 3b. Plainly apparent from this FIG. 3c is, apart from said cooling air duct 4, the cooling air chamber 7 and to the left- and right-hand sides of it the contours 1b of fir-tree blade root 1.

Outlet port 5 of cooling air duct 4 is preferably designed such that the cooling air flow issuing from outlet port 5 has a velocity component directed counter to the direction of rotation of blades 2 in the turbomachine or axial-flow high-pressure turbine. This applies equally to the embodiment of FIG. 3a and those of FIGS. 1a, 2a, where outlet port 5 of cooling air duct 4 as it exits from lock-plate 3 is designed such that the issuing cooling air flow has a velocity component counter to the direction of rotation of rotor disk 8. This design of outlet port 5 becomes apparent in the various embodiments from FIGS. 1b, 1c, 2b, 3b and 3c, with the outlet direction of the cooling air flow being indicated by arrowheads 9 and the direction of rotation of rotor disk 8 by arrowhead ω. In this arrangement, the cooling air flow issuing from blade root 1 in the direction of space 6 is deflected into the opposite direction of rotation ω of the rotor disk, the cooling air flow giving added action on rotor disk 8 and reducing the outlet swirl of the cooling air flow issuing from blade root 1.

Summarizing, then, the optimized aerodynamic flow through continuous, convergent cooling air duct 4 and its deflection therein will in an application of the present invention cool this flow by about 100° on an absolute temperature scale. Optimized natural deflection and relief of the cooling air flow through axial-flow microturbine cooling air flow ducts 4 accordingly achieve, by a simple construction and with no need for additional components, an excellent cooling effect on rotor disk 8' downstream of rotor disk 8 or on further stages of the axial-flow high-pressure turbine. It should be noted however that the design of blade 2 or rotor disk 8 as described above is not limited to axial-flow high-pressure turbines, but naturally is applicable to turbomachines generally.

Figure 2B:
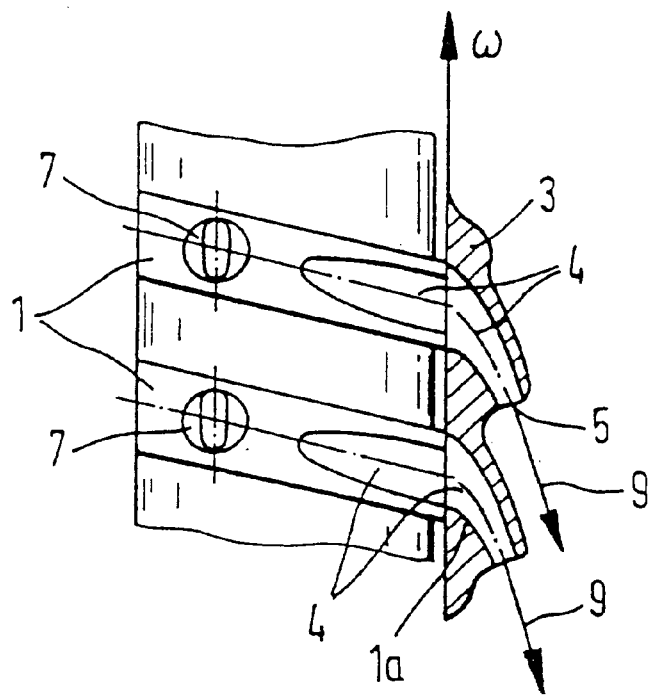

With reference again to the embodiment of FIGS. 2a, 2b, lock-plate 3 is designed, in the convergent portion of cooling air duct 4, wide enough so that the portion of cooling air duct 4 inside lock-plate 3 is long enough to deflect the cooling air stream. In this arrangement the convergent portion of cooling air duct 4 is substantially in lock-plate 3, while the portion of cooling air duct 4 extending in blade root 1 proper is made less convergent. It will be appreciated however that this detail, as well as many other details, particularly in design, can be allowed to differ from the embodiments illustrated without departing from the inventive concept expressed in the claims.

What is claimed is:

1. A turbine blade for use in a rotor assembly in an axial flow, high-pressure turbine in a turbomachine, said turbine blade comprising:

a blade root and a blade portion extending from said blade root, said blade portion having a gas-wetted surface and at least one cooling air duct internally formed therein, said at least one cooling air duct issuing at the gas-wetted surface of said blade portion, said blade root having a cooling air chamber internally formed therein and configured to provide cooling air to said at least one cooling air duct, said blade root further having a cooling air passage internally formed therein, said integrated cooling air passage branching off from said cooling air chamber and issuing at an outlet port at a downstream, back surface of said blade root, said cooling air passage being configured to provide a substantially continuous passage for cooling air to pass from said cooling air chamber and to exit from said blade root at said downstream, back surface of said blade root, said cooling air passage further being configured to deflect the cooling air which it carries in a circumferential direction with respect to a turbine rotor assembly in which said turbine blade is to be installed.

2. A turbine blade in accordance with claim 1, wherein the shape of the cooling duct converges from the cooling air chamber toward the outlet port.

3. A turbine blade in accordance with claim 1 or 2, wherein the cooling air duct is shaped in accordance with design rules for axial-flow reaction turbines.

4. A turbine blade in accordance with claim 1, wherein the outlet port is designed such that cooling air flow issuing from it is deflected so as to have a velocity component directed counter to the direction of rotation of the blade when the blade is installed in and rotating with the rotor assembly in the turbomachine.

5. A rotor assembly for use in an axial flow, high-pressure turbine in a turbomachine, said rotor assembly comprising:

a rotor disk;

a plurality of rotor blades attached to said rotor disk, said rotor blades each comprising a blade root and a blade portion extending from said blade root, said blade portion having a gas-wetted surface and at least one cooling air duct internally formed therein, said at least one cooling air duct issuing at the gas-wetted surface of said blade portion, said blade root having a cooling air chamber internally formed therein and configured to provide cooling air to said at least one cooling air duct, said blade root further having an integrated cooling air passage internally formed therein, said integrated cooling air passage branching off from said cooling air chamber and issuing at an outlet port at a downstream, back surface of said blade root, said cooling air passage being configured to provide a substantially continuous passage for cooling air to pass from said cooling air chamber and to exit from said blade root at said downstream, back surface of said blade root, said cooling air passage further being configured to deflect the cooling air which it carries in a circumferential direction with respect to the rotor assembly; and a lock-plate attached to said rotor disk behind said plurality of rotor blades in a downstream direction with respect to said turbine, said lock-plate have a plurality of air passages extending therethrough, wherein said turbine blades and said lock-plate are cooperatively arranged such that cooling air passing out of the blade roots of said turbine blades through the outlet ports of the cooling air passages of said blade roots passes through the plurality of air passages extending through said lock-plate.

6. A rotor assembly in accordance with claim 5, wherein the outlet ports of the cooling air passages in the blade roosts of the plurality of rotor blades and the plurality of air passages extending axially through the lock-plate are cooperatively designed such that they impart to cooling air flow issuing from the air passage extending through the lock-plate a velocity component counter to the direction of rotation of the rotor disk in the turbomachine.

7. A rotor assembly in accordance with claim 1 or 6, wherein the air passages extending through the lock-plate converge and deflect the cooling air flow passing through them.

8. An axial flow, high-pressure turbine assembly for use in a turbomachine, said turbine assembly comprising:

a first stage rotor assembly comprising a first stage rotor disk and a plurality of first stage rotor blades attached to said first stage rotor disk, said first stage rotor blades each comprising a blade root and a blade portion extending from said blade root, said blade portion having a gas-wetted surface and at least one cooling air duct internally formed therein, said at least one cooling air duct issuing at the gas-wetted surface of said blade portion, said blade root having a cooling air chamber internally formed therein and configured to provide cooling air to said at least one cooling air duct, said blade root further having an integrated cooling air passage internally formed therein, said integrated cooling air passage branching off from said cooling air chamber and issuing at an outlet port at a downstream, back surface of said blade root, said cooling air passage being configured to provide a substantially continuous passage for cooling air to pass from said cooling air chamber and to exit from said blade root at said downstream, back surface of said blade root, said cooling air passage further being configured to deflect the cooling air which it carries in a circumferential direction with respect to the first stage rotor assembly; and a second stage rotor assembly comprising a second stage rotor disk and a plurality of second stage rotor blades attached to said second stage rotor disk, said second stage rotor being located downstream of said first stage rotor;

wherein the integrated cooling air passages formed in the blade roots of the rotor blades of the first stage rotor are shaped as axial flow micro-turbine ducts which cool cooling air flowing therethrough and are configured to direct the cooling air flowing therethrough into a space formed between said first stage rotor and said second stage rotor, said space being located radially inward of said first and second stage rotor blades with respect to said turbine assembly.

* * * * *